United States Patent [19]

Duill et al.

[11] 4,272,710

[45] Jun. 9, 1981

[54] METHOD AND APPARATUS FOR THE ADJUSTMENT OF A DEFINITE POSITION OF REST OF A ROTARY TUBE

[75] Inventors: Helmut Duill; Jakob Ansén, both of Cologne, Fed. Rep. of Germany

[73] Assignee: Klockner-Humboldt-Deutz AG, Fed. Rep. of Germany

[21] Appl. No.: 40,567

[22] Filed: May 21, 1979

[30] Foreign Application Priority Data

May 26, 1978 [DE] Fed. Rep. of Germany ....... 2823140

[51] Int. Cl.³ .............................................. G05G 5/00
[52] U.S. Cl. .................... 318/470; 318/640; 318/653
[58] Field of Search ............... 318/470, 672, 640, 653, 318/468

[56] References Cited

U.S. PATENT DOCUMENTS

| | | | |
|---|---|---|---|
| 3,659,172 | 4/1972 | Kuniaki et al. | 318/470 X |
| 3,668,496 | 6/1972 | Markowitz et al. | 318/468 X |
| 3,888,338 | 6/1975 | Mars | 318/470 X |

*Primary Examiner*—B. Dobeck
*Attorney, Agent, or Firm*—Hill, Van Santen, Steadman, Chiara & Simpson

[57] ABSTRACT

A method is provided for adjusting or setting a definite position of rest of a rotary tube, particularly of a tube mill, by switching off the drive of the tube and is particularly characterized in that, at a time $T_o$, the angular position of the rotary tube, or of a drive part rotating with a tube, referred to a plane of comparison is established, that the idling movement of the tube is predetermined between disconnection and final standstill, and the angular position of the rotary tube and/or of the time $T_x$ at which the drive is disconnected is calculated and effected.

6 Claims, 3 Drawing Figures

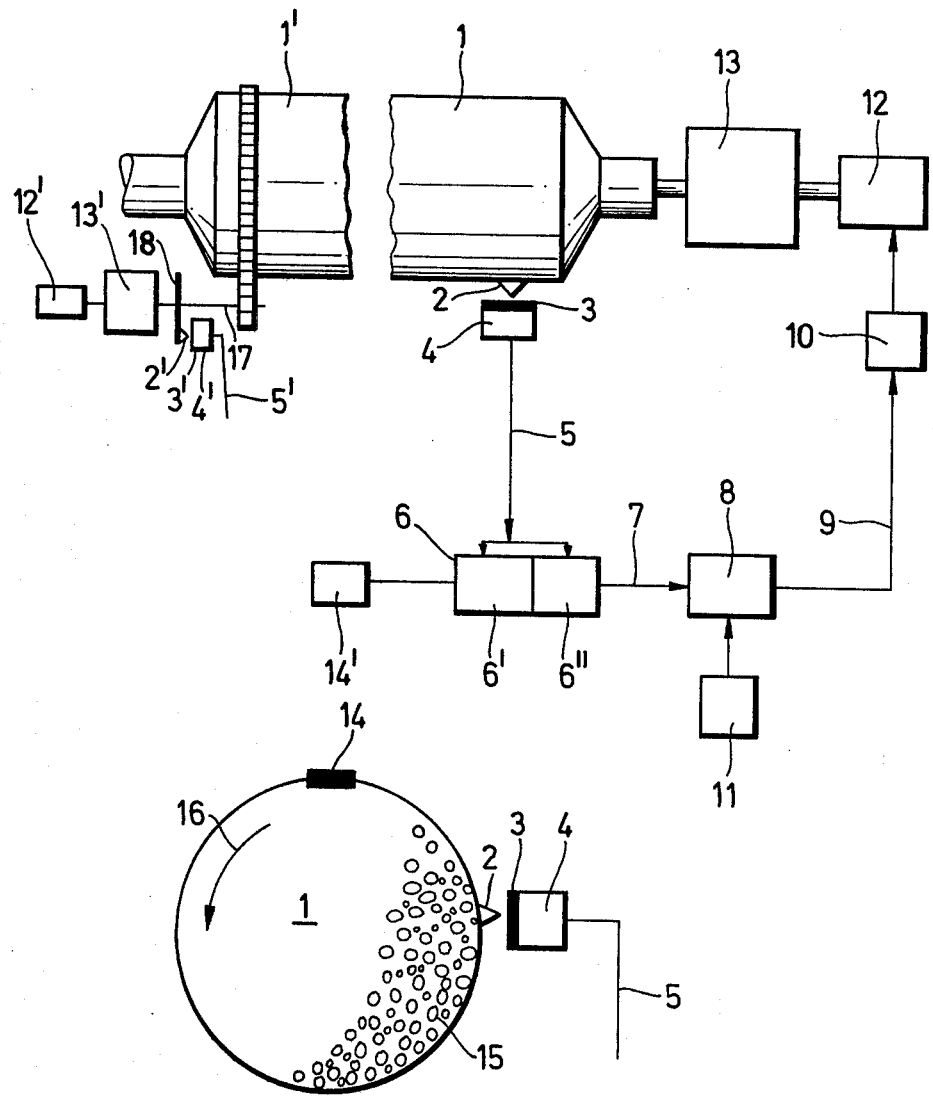
FIG. 1
FIG. 2
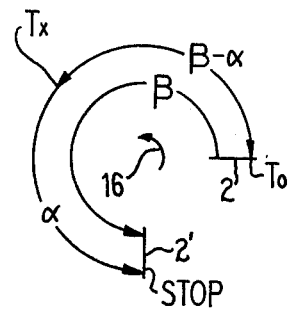
FIG. 3

METHOD AND APPARATUS FOR THE ADJUSTMENT OF A DEFINITE POSITION OF REST OF A ROTARY TUBE

BACKGROUND OF THE INVENTION

1. Field of the Invention

The present invention relates to a method and to an apparatus for adjusting a definite position of rest of a rotary tube, particularly of a tube mill, by means of terminating energization of the drive.

2. Description of the Prior Art

The adjustment of a definite position of rest of a rotary tube, particularly of a tube mill, becomes necessary in the case of standstill for the purpose of operation and maintenance of the mill, particularly of the inner chamber of the mill. In addition, the maintenance of a definite position in the case of the so-called interval rotation in the starting position is of importance for the prevention of deformations of the tube caused by temperature and tension. If in particular a mill is shut off from normal operation, then tensions occur in the mill tube, which with long tubes (for example cement mills) may lead to appreciable damages, in that the filling of the grinding body maintains the temperature derived from the grinding process for a longer time, while the surface of the tube which is not covered by grinding bodies transmits the heat relatively quickly into the surrounding environment. Between the upper portion and the lower portion of the tube, under these circumstances, a temperature difference arises, which together with the one-sided load may lead to permanent deformation of the tube.

In order to attain a uniform protective cooling of the mill tube, the mill tube must therefore, after termination of normal operation, be rotated over a longer period of time, for example 6 hours at intervals of, for example, 30 minutes each, over a predetermined angle. With the state of the art, it is conventional to equip the mill for this purpose, in particular, with an auxiliary drive. Advantageously, in this connection, the magnetic flux of the auxiliary drive is fed through the main drive, because in this case the auxiliary drive, due to the relatively high total translation is to be provided only for a relatively low torsional or twisting moment, for which reason its costs do not exceed approximately 10% of the main drive.

Apart from this expenditure of the auxiliary drive, necessary only for unproductive measures, it is found as a further disadvantage that its maintenance and servicing upon connection and disconnection, as well as its upkeep, imposes particular responsibilities on the operating and maintenance personnel.

In addition to this, however, further difficulties arise from the auxiliary drive with slowly-traveling driving motors, as the latter are frequently encountered at the present time. The expenditure and costs for an auxiliary drive having comparable output are increased in many cases in relation to the torsional or twisting moments.

SUMMARY OF THE INVENTION

The object of the present invention, therefore, is to provide a method, and a corresponding apparatus, in order to provide that the main drive fully takes over the function of the auxiliary drive, while overcoming previously existing difficulties which include that it was not possible with the main drive to reliably control a definite position of the mill to a standstill position, because outside of the idling movement which is evaluated with difficulty, the center of gravity position with the mass system causes a so-called "after-swinging" whose correct compensation upon disconnection is not possible by hand. In addition, there was no possibility of picking up or determining, without visual observation of the mill, for example from a remote-surfacing cabinet or panel, the correct shut-off point of time.

The object of the present invention is, therefore, to overcome these difficulties, in a simple manner, i.e. in a "foolproof manner", without great expense and to make possible remote maintenance and the possibility of an interval rotation by means of automatic control without manual intervention. Most advantageously, it is an object to achieve the foregoing through the use of simple switch elements and/or electronic building blocks which are readily available on the market.

The solution of the aforementioned problem and achievement of the object of the invention consists in that, at a point of time $T_o$, the angular position of the rotary tube or of a drive part similarly rotating, refer to a plane of comparison is selected and that the idling movement of the tube is determined between shut-off and final standstill, and that the angular position of the rotary tube and/or the point of time $T_x$ for shut-off is calculated.

In this manner, the following advantages result:

1. The tube, upon standstill, after discharge and swinging out of the mass system comes to a standstill in a predetermined position, without subsequent rotation.
2. Elimination of the investment expense and operational expense from the auxiliary drive.
3. Simplification of servicing and maintenance of the grinding installation.
4. Possibility of definite information and, thereby, remote control without visual observation of the system.
5. Maintenance of exact plays of movement, for example, with interval rotation, within desired narrow tolerances, as well as the possibility of automation.

In the embodiment of the method, it is provided that, upon the idling movement, both the lagging, as well as the backswing of the rotary tube is taken into consideration, corresponding to the mass center of gravity in the final position of rest of the system.

In this manner, both reliably and without complication, the adjustment of a definite, predetermined angular position of the rotary tube is ensured.

An apparatus for carrying out the method of the invention is characterized in that the rotary tube and/or a part of the rotating drive, advantageously, at least one contactless switch arrangement, which cooperates with a stationary contact arrangement, and which releases a control pulse in a definite angular position of the tube, which is connected through a control circuit of a control unit equipped, advantageously, with a logic circuit. The control unit is equipped with an adjustable delay member and the output thereof is superposed through a logic unit and adding unit with the output switch of the drive motor.

In a further embodiment of the apparatus, it is provided that the contact arrangements are portions of a mechanical, electrical, optical or acoustic contact system. In this manner, it may be a question, for example, of contactless magnetic switches or inductively or capacitively energized switches, of light barriers, as well as mechanical switches, along with devices which are used in the art and whose selection lies within the judgment of those skilled in the art in respect of the particular application.

In a further embodiment of the invention, it is provided that the rotary tube and/or a part of the drive is equipped with a plurality of contact arrangements.

And, finally, a logic unit may be provided with an input unit for the input of operational data. This device serves for providing an input of information, preferably digital, relating to the idling behavior of the rotary tube, whereby the angles or times of discharge movement, determined by means of tests or operating experience in the idling condition, are fed in for consideration of the shut-off time or an angular setting at the moment of shut-off, to a computer.

BRIEF DESCRIPTION OF THE DRAWING

Other objects, features and advantages of the invention, its organization, construction and operation will be best understood from the following detailed description, taken in conjunction with the accompanying drawing, on which:

FIG. 1 is a schematic representation of a tube mill having a control system connected thereto in accordance with the present invention;

FIG. 2 is a schematic representation of a sectional view taken through the tube 1 of FIG. 1; and FIG. 3 is a polar plot illustrating the times and/or angular displacements of the tube 1 with respect to shut-off of the drive.

DESCRIPTION OF THE PREFERRED EMBODIMENTS

Referring to FIG. 1, a rotary tube 1 is provided at the periphery thereof with a contact arrangement 2. The contact arrangement 2 may be either a mechanical trip cam, a magnetic switch, an optical switch or the like. The contact arrangement 2 causes, upon approaching of a stationarily arranged contact arrangement 3, a switch pulse in a contact system 4. The pulses of the contact system 4 are advantageously amplified and, through a control line 5 are fed into a control unit 6 which includes a logic unit 6' and a delay circuit 6". The logic unit 6' calculates, on the basis of the determined idling movements of the particular tube in question, taking into consideration the load therein, the angular setting and/or the shut-off time $T_x$ for providing a shut-off pulse, and sets the latter through the delay circuit 6" in accordance therewith. The control signals fed from the delay circuit 6" and through a line 7 on the logic and addition unit 8, and with the aid of a control line 9 act on the connect and shut-off relay 10 of the motor 12 which is connected in driving relationship with the tube 1 by way of a gear unit 13. Therefore, in a manner known per se, a superimposed control connection or circuit is provided in the sense that the control pulses of the connect/shut-off arrangement 11 displace and render inactive the shut-off order issued therefrom until the appropriate time.

For an explanation of the operation of the invention, reference is made additionally to FIG. 2 and to FIG. 3, FIG. 2 illustrating the rotary tube 1 in section. The rotary tube 1 includes a manhole 14. The rotary tube 1 also includes a load or filling 15, consisting of grinding bodies and grinding material, as well as a contact maker 2 and a receiver 3 of the contact system 4. From the contact system 4, the control conduit 5 leads to the control unit 6 as illustrated in FIG. 1.

In the position illustrated, the contact arrangements 2 and 3 are in the contact position and effect the generation of the pulse on the lead 5 at which time the manhole 14 is located, for example, at the Zenith of the rotary tube 1. The rotary tube 1 is, in this connection, still in full movement, as indicated by the arrow 16.

Through a pre-test operation, the operation now establishes, for example, that the rotary tube 1, after shut-off of the drive (12, 13) completes further rotational movement about a determined angle until the same comes to a standstill. This value is fed into the logic unit 6' with the input unit 14'. After receipt of a swtich pulse, over the lead 5, from the contact system 4, the logic unit 6' calculates the necessary delay between the contact point of time $T_o$ and the shut-off time $T_x$, and adjusts for the calculated amount of the delay time interval for the delay circuit 6". The delay circuit 6" awaits the adjusted time $T_0+\Delta T=T_x$, and emits, at the time $T_x$, the shut-off command in the form of an electrical pulse. This electrical pulse reaches the control and addition unit 8, which renders inactive the predetermined command of the digital connecting/shut-off switch 11, and through the relay 10 disconnects the motor 12.

After slow-down and oscillation, the rotary tube 1 then comes to a standstill at the predetermined position, for example with the manhole at the lowermost point.

The method is further explained by reference to FIG. 3 in which the drum rotation is oriented in the same manner as illustrated in FIG. 2. In FIG. 3, the angle $\alpha$ is determined for idling of the tube 1 between the disconnection point $T_x$ and standstill (stop), and in the rotary movement of the tube, an angle $\beta$ is determined between the defined position, which is to be attained at standstill, and the position of the tube at the time $T_0$. The point of time for disconnection of the drive $(T_x=T_0\Delta T)$ is computed, taken as a basis the determined angle $(\beta-\alpha)$ and the known angular velocity of the rotary tube $v=x°$/sec.

The rotary tube 1 with the contact operator 2 moves in the direction of the arrow 16 with an angular velocity $V=x°$/sec. The rotary tube 1 should be shut down such that its contact device 2 at the position 2', the so-called defined position of stop, after the disconnection of the drive and the tube coming to a standstill.

It was first determined, by means of test dated, that the rotary tube covers a stopping distance between the disconnection point of time $T_x$ and a standstill (stop) after idling, which corresponds to the angle $\alpha$. In the assumed example, the angle $\alpha$ amounts to $\alpha=120°$. In the moment of the contact operation between the contact arrangement 2 of the tube 1 and the stationary contact arrangement 3 and the contact system 4, for the point of time $T_0$, between the position of the rotary tube 1 in the point of time $T_0$ and of the defined position after the disconnection, an angle $\beta$ results, which in the example provided amounts to 270°. It therefore follows that the angle $(\beta-\alpha)=150°$. In the case of an assumed angular velocity of 6° per sec. corresponding to 1 rpm. the necessary delay until the moment of the disconnection $(T_x)$ is computed at $\Delta T=25$ seconds. If then 25 seconds after triggering of the pulse $T_0$, at the point of time $T_x$, the drive is disconnected, and the drum thereafter still carries out a stopping distance corresponding to the angle $\alpha$, then the drum will come to a standstill exactly at the defined position 2'.

The input 14' is used for manual input of the angle α determined in an operational test, as well as the angle β determining the defined position after disconnection. From this, the control unit 6 with the logic unit 6' computes, corresponding to the numbered example provided, the delay time ΔT, and connects the same to the delay circuit 6".

The disconnection order, which in the switch 11, for example, was manually input, is stored by the logic and adding unit 8 so that, after the triggering of the pulse $T_o$ and after the delay point ΔT, the point of time for disconnection $T_x$ is reached.

Only then does the logic and addition unit 8 transmit the order for disconnection by means of the control line to the switch relay 10, which disconnects the drive 12 at the point of time $T_x$.

The method and apparatus discussed above are provided only by way of example, that is, that for one skilled in the art with the knowledge of the problem and the teaching of the invention, a series of further embodiments may be readily apparent, which have as the subject matter mechanical or technically-controlled modifications, which, however, fall within the range of knowledge of one skilled in the art and accordingly come under the definitions of the present invention.

For example, the switch pulse, as has already been mentioned, and according to the illustration on the left-hand portion of FIG. 1, may be set on a pinion shaft 17 of a drive 12', 13' with the aid of a cam disc 18 having a cam trip 2" as well as a contact arrangement 3', 4'. In addition, a slide contact of the angular position of the rotary tube 1' at any other point of the drive or transmission may take place without the fact that the same deviates from the present invention.

Although we have described our invention by reference to particular illustrative embodiments thereof, many changes and modifications of the invention may become apparent to those skilled in the art without departing from the spirit and scope of the invention. We therefore intend to include within the patent warranted hereon all such changes and modifications as may reasonably and properly be included within the scope of our contribution to the art.

We claim:

1. A method of setting a definite standstill position of a rotary mill tube, without braking, upon switching off of the tube drive and subsequent inertial rotation of the tube, comprising the steps of:
    testing the switch-off-to-standstill condition to determine the amount of angular rotation therebetween;
    generating a reference time pulse prior to switch-off;
    delaying the reference time pulse by a predetermined time relating to the amount of angular rotation between switch-off and standstill to produce a desired angular position of the tube; and
    generating and applying a switch-off signal to the tube drive upon expiration of the delay time of the reference time pulse.

2. The method of claim 1, wherein the step of testing is further defined as:
    determining the lag from disconnect to standstill including pendulum motion of the tube.

3. Apparatus for controlling the switch-off of the drive of a rotary mill tube to obtain a defined standstill position without braking, comprising;
    at least one switch means including a first portion carried on the tube and a second, stationary portion operable to generate a first pulse upon rotation of said first portion past said second portion;
    input means for generating first and second digital data representing a first angle of travel of the tube after shut-off of the drive and a second angle of travel of the tube from a reference in relation to a desired orientation of the tube at standstill;
    angular calculation means operated in response to said first pulse and said first and second digital data to emit a second pulse;
    a start-stop command circuit for selectively generating start and stop signals; and
    a control circuit connected to said angular calculation means and to said start-stop command circuit and connected to the tube drive, and responsive to a stop signal to produce a third pulse to deenergize the tube drive.

4. The apparatus of claim 3, wherein said switch means comprises:
    a mechanically-operated electrical switch.

5. The apparatus of claim 3, wherein said switch means comprises:
    an optically-operated electrical switch.

6. The apparatus of claim 3, wherein said switch means comprises:
    an acoustically-operated electrical switch.

* * * * *